United States Patent
Lien

[11] Patent Number: 5,419,691
[45] Date of Patent: May 30, 1995

[54] ROTARY ENGINE PISTON AND SEAL ASSEMBLY

[76] Inventor: Orphey A. Lien, P.O. Box 2047, NSR, Poplar, Mont. 59255

[21] Appl. No.: 112,938

[22] Filed: Aug. 30, 1993

[51] Int. Cl.⁶ ............................................. F02B 53/00
[52] U.S. Cl. ................................... 418/68; 418/193
[58] Field of Search ............... 123/241, 243; 418/68, 418/104, 193

[56] References Cited

U.S. PATENT DOCUMENTS

| | | | |
|---|---|---|---|
| 764,465 | 7/1904 | Hendricks | 418/193 |
| 769,082 | 8/1909 | Hendricks | 418/193 |
| 1,376,397 | 5/1921 | Bylger | 418/193 |
| 2,482,325 | 9/1949 | Davis | 418/193 |
| 2,621,852 | 12/1952 | Pisa | 418/68 |
| 4,029,444 | 6/1977 | Clarke | 418/120 |
| 4,080,116 | 3/1978 | Mokratschek et al. | 418/75 |
| 4,721,079 | 1/1988 | Lien | 123/241 |

*Primary Examiner*—Michael Koczo
*Attorney, Agent, or Firm*—Hopkins, Roden, Crockett, Hansen & Hoopes

[57] ABSTRACT

The rotary engine piston and seal assembly is disclosed that improves engine efficiency and power and reduces wear on an inner housing surface. It has a somewhat cube-shaped piston and a pair of grooves running around all four sliding side surfaces. The grooves contain a series of segmented metal seals and are compressed against the mating surfaces by a group of seal springs.

16 Claims, 4 Drawing Sheets

ROTARY ENGINE PISTON AND SEAL ASSEMBLY

FIELD OF THE INVENTION

This invention relates to an improved spherical rotary engine rotor piston and seal assembly that reduces housing wear and improves engine efficiency.

1. Background of the Invention

Rotary engines are well known in the art and have impressive power per unit weight. One of their drawbacks is friction as a result of centrifugal force on the rotor parts and wear of sliding surfaces and seals whether the engine is the dual-lobe type or a spherical-housing type. Additionally, engine compression and, therefore, efficiency, is related to how well the engine seals prevent leakage to the inlet air passages and adjacent combustion chambers.

2. Discussion of the Prior Art

A rotary engine is disclosed in U.S. Pat. No. 4,721,079 issued to the present inventor which is a spherical housing having a pair of internal solid (one piece) rotors and multiple cross-vanes that bear against the inside of the housing creating friction that varies as the square of the rotational speed. There are no seals on the rotor periphery, but there are seals to the combustion chamber and cross-vanes as will be described later.

It is, therefore, the purpose of this invention to provide a simple piston and piston ring seal that effectively seals the intersections of the rotor piston to the cross-vane side walls and the inner and outer periphery of the piston with the housing and inner surface. The use of rotor pistons also provides for easier fabrication and less moving parts.

SUMMARY OF THE INVENTION

The present invention is an improved rotor piston and seal member that seals the four surfaces of a piston in a rotary engine as in U.S. Pat. No. 4,721,079 issued to the present inventor.

The invention, generally stated, is piston and seal assembly for a spherical rotary engine having a pair of rotor hubs, an affixed air vane, and a plurality of cross-vanes at 90° to said rotor hubs, comprising:

a six-sided piston having a pair of grooves connecting top, bottom, and pair of opposing sides of the piston;

a plurality of segmented piston seal rings within the grooves;

a vertical cylinder within the piston having a vertical slot; and a captive pivot pin within the vertical cylinder, the vertical slot providing access to affix an upper portion of the air vanes to the pivot pin, thereby providing vertical and rotational freedom of motion to the piston relative to the rotor hub.

Other objects, advantages, and capabilities of the present invention will become more apparent as the description proceeds.

DETAILED DESCRIPTION OF THE PREFERRED EMBODIMENTS

Figure 1:
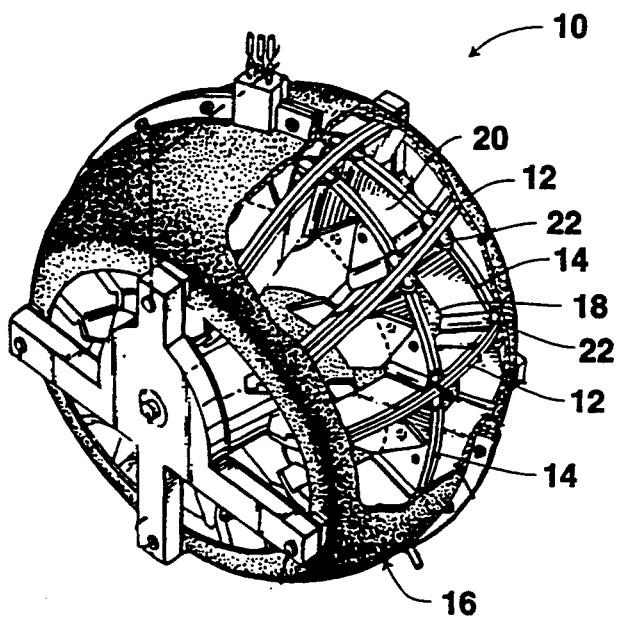
FIG. 1 is a partial cut-away perspective view of a rotary engine (prior art)

FIG. 1 illustrates prior art multi-vane rotary engine 10 as disclosed in U.S. Pat. No. 4,721,079, by the same inventor. The multiple cross-vanes 12 rotate along with a pair of slotted rotors 14 within frame 16. The two rotors 14, two cross-vanes 12, frame 16, and stationary surface 18 form a cube-shaped combustion chamber 20. A pair of pivot blocks 22 form a seal between the rotor wall segment 24 and cross-vane 14 (FIG. 2).

Figure 2:
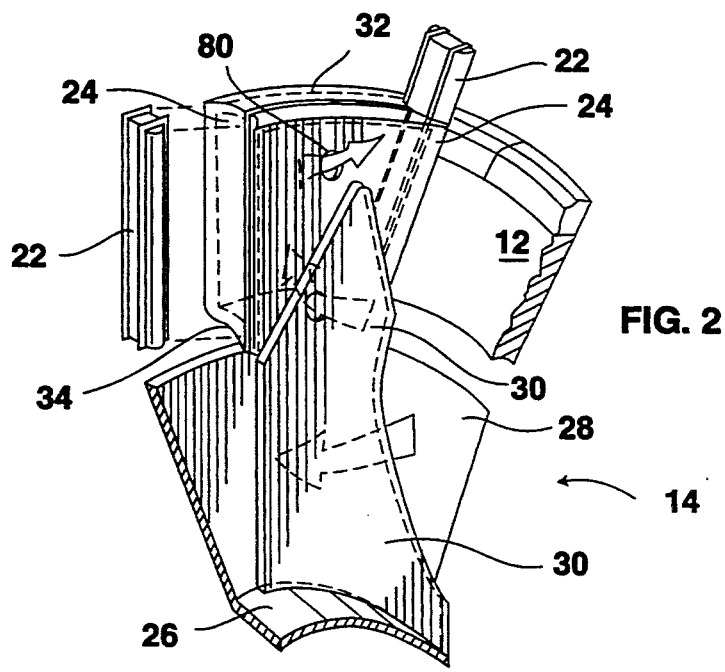
FIG. 2 is a partially exploded view of a rotary engine and rotor pivot seal (prior art)

FIG. 2 shows the prior art rotor 14 having rotor hub 26, ring 28, air vane 30, and segment 24 as one solid unit, i.e., all pieces are welded together. Consequently, there is no freedom of movement of the wall segments 24 relative to the outer frame 16 or the hub. There is also no separate seal on outer edge 32 of wall segment 24 nor on the outer edge 34 of segment 24.

To improve the efficiency of the engine, the improved rotary engine piston and seal assembly has been developed as 40 illustrated in FIGS. 3-7. The top view (FIG. 3) shows the somewhat cube-shaped (6-sided) pistons 42 located between cross-vanes 44. Also shown are air vanes 46, and four groups of L-shaped piston seals 48 that are captive within square grooves 50 in piston 42.

Figure 3:
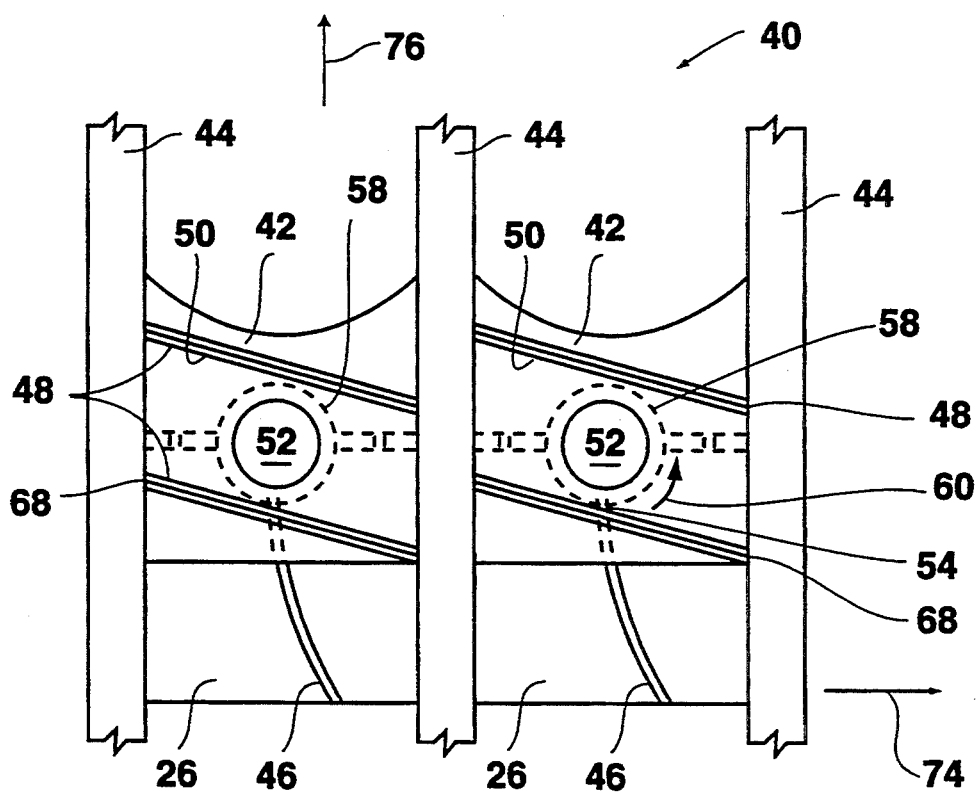
FIG. 3 is a partial top view of a rotary engine rotor, piston, and cross-vane having a seal of the present invention.
Figure 4:
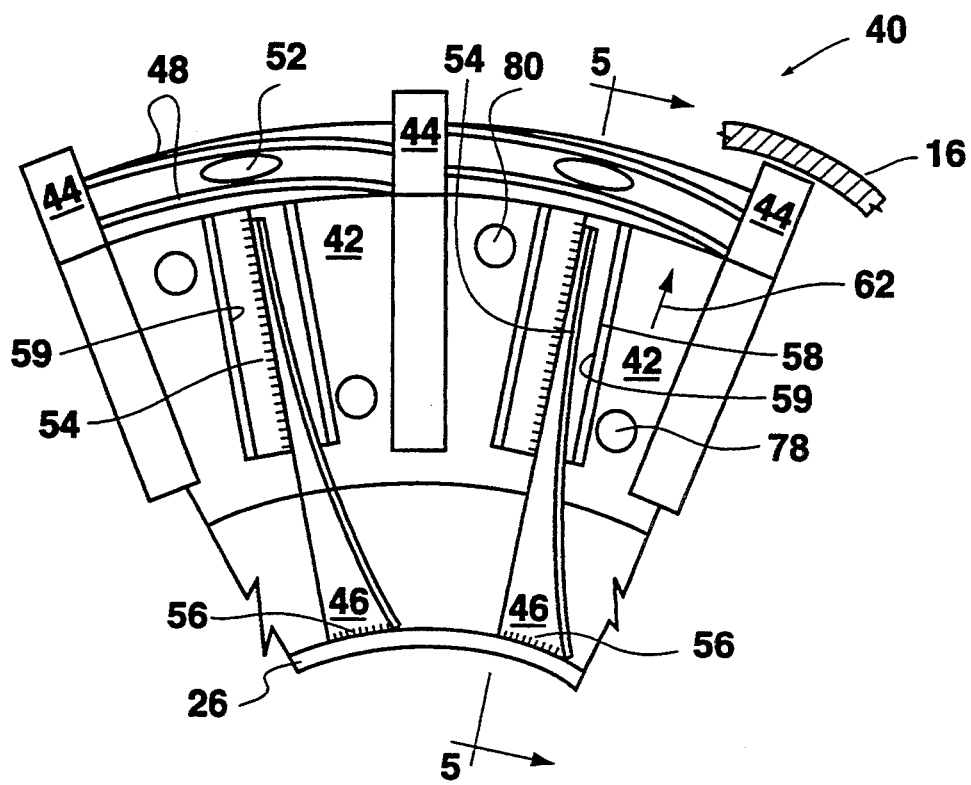
FIG. 4 is a partial front elevation of the engine rotor, piston, and seal.

Referring to FIG. 4, air vanes 46 are attached to pivot pins 52 as at welded connection 54 and also welded at bottom portions 56 to hub 26. The pivot pins 52 are held within piston 42 by a ¾" round cylinder 58 having a vertical slot 59, thereby allowing slight rotation as at arrow 60 (FIG. 3) and a slight piston vertical motion as at 62 in FIG. 4. This allowed motion will reduce friction between the seals 48 and irregularities on the housing 16 inner surface.

Figure 5:
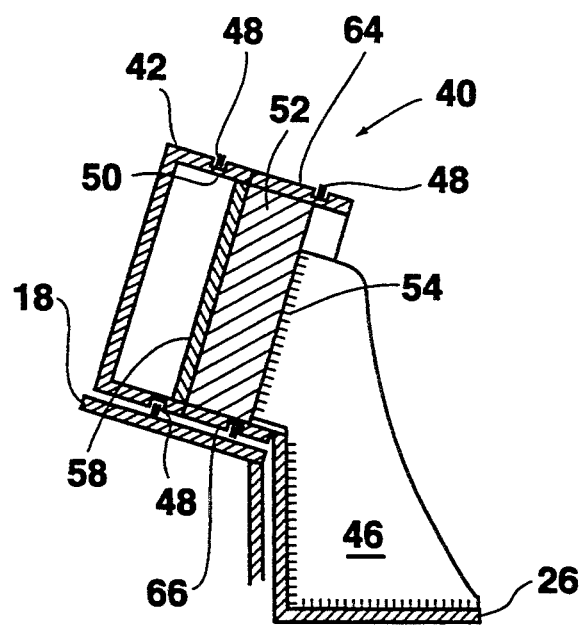
FIG. 5 is a side-section view taken along lines 5—5 of FIG. 4.

Referring to the FIG. 5 section view through the piston 42, pin 52, hub 26 and ¾" round cylinder 58, the seal rings 48 can be seen in section with square grooves that are connected on all four sides of the piston, i.e., top 64, bottom 66, and opposite sides 68 (FIG. 3).

Figures 6, 7:
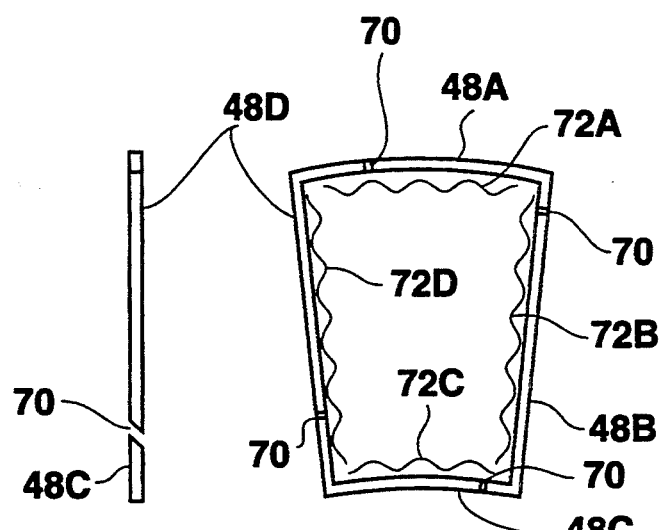
FIG. 6 is a front elevation of the seal member and expander rings.
FIG. 7 is a side elevation of the seal member.

FIG. 6 is the front elevation of the four separate seal ring segments 48A, 48B, 48C, and 48D, all having a bevel ends as at 70 (FIG. 7). The four segments of seal 48 are lightly compressed against the housing 16, the stationary inner surface 18, and cross-vane 44 surfaces by four corrugated seal springs 72A–72D. Seal spring 72A would provide less compression since centrifugal force will provide outward thrust of the seal 48A. There would typically be three or more seals 48 per piston groove 50.

Referring again to FIG. 3, as the hub 26 and vanes 44 rotate in direction of arrow 74, the pistons 42 move in direction of arrow 76 and represent the compression part of the cycle which would tend to have vapor leakage across seals 48A–48D opposite to arrow 76.

Cooling of the piston 42 is provided by inlet air passing through inlet aperture 78 (FIGS. 2 and 4) inside the piston and then through outlet aperture 80.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. In a spherical rotary engine having pair of rotor hubs, an air vane affixed to each rotor hub, and a plurality of cross-vanes each slidably affixed between an external housing, a stationary internal surface, and a pair of pistons, thereby forming a variable volume combustion chamber, a piston and piston seal assembly comprising:
   (a) a six-sided piston rotatably affixed to the air vane, having a plurality of grooves connecting top, bottom, and pair of opposing sides of the piston;
   (b) a plurality of segmented piston seal rings within the grooves;
   (c) a vertical cylinder within the piston having a vertical slot; and
   (d) a captive pivot pin within the vertical cylinder, the vertical slot providing access to affix an upper portion of the air vane to the pivot pin, thereby providing vertical and rotational freedom of motion to the piston relative to the rotor hub.

2. The assembly of claim 1 wherein the number of grooves in the piston is two.

3. The assembly of claim 2 wherein the number of seal rings in each side, top, and bottom groove is three.

4. The assembly of claim 3 wherein the seal rings are L-shaped and are beveled at each end.

5. The assembly of claim 2 wherein the grooves are at an acute angle with the opposing sides of the piston.

6. The assembly of claim 4 wherein the seal rings are compressed against a mating surface by a plurality of seal springs within the grooves.

7. The assembly of claim 6 wherein the number of seal springs is four.

8. In a spherical rotary engine having pair of rotor hubs, an air vane affixed to each rotor hub, and a plurality of cross-vanes each slidably affixed between an external housing, a stationary internal surface, and a pair of pistons, thereby forming a variable volume combustion chamber, a piston and piston seal assembly comprising:
   (a) a six-sided piston rotatably affixed to the air vane, having a plurality of parallel grooves connecting top, bottom, and pair of opposing sides of the piston;
   (b) a plurality of segmented L-shaped piston seal rings within the grooves;
   (c) a vertical cylinder within the piston having a vertical slot; and
   (d) a captive pivot pin within the vertical cylinder, the vertical slot providing access to affix an upper portion of the air vane to the pivot pin, thereby providing vertical and rotational freedom of motion to the piston relative to the rotor hub.

9. The assembly of claim 8 wherein the number of seal rings in each side, top, and bottom groove is three.

10. The assembly of claim 9 wherein the grooves are at an acute angle with the opposing sides of the piston.

11. The assembly of claim 10 wherein the seal rings are compressed against a mating surface by a plurality of seal springs within the grooves.

12. The assembly of claim 11 wherein the number of seal springs is four.

13. In a spherical rotary engine having pair of rotor hubs, an air vane, and a plurality of cross-vanes each slidably affixed between an external housing, a stationary internal surface, and a pair of pistons, thereby forming a variable volume combustion chamber, a piston and piston seal assembly comprising:
   (a) a six-sided piston rotatably affixed to the air vane, having a plurality of parallel grooves connecting top, bottom, and pair of opposing sides of the piston;
   (b) a set of three overlapping and segmented L-shaped piston seal rings within the grooves;
   (c) a vertical cylinder within the piston having a vertical slot; and
   (d) a captive pivot pin within the vertical cylinder, the vertical slot providing access to affix an upper portion of the air vane to the pivot pin, thereby providing vertical and rotational freedom of motion to the piston relative to the rotor hub.

14. The assembly of claim 13 wherein the grooves are at an acute angle with the opposing sides of the piston.

15. The assembly of claim 14 wherein the seal rings are compressed against a mating surface by a plurality of seal springs within the grooves.

16. The assembly of claim 15 wherein the number of seal springs is four.

* * * * *